（12）United States Patent
Howard et al.

(10) Patent No.: US 9,079,775 B2
(45) Date of Patent: Jul. 14, 2015

(54) METHOD FOR SEPARATING NANOMATERIALS

(75) Inventors: Christopher Howard, London (GB);
Neal Skipper, London (GB); Milo Shaffer, London (GB); Sian Fogden, London (GB)

(73) Assignee: UCL Business PLC, London (GB)

( * ) Notice: Subject to any disclaimer, the term of this patent is extended or adjusted under 35 U.S.C. 154(b) by 783 days.

(21) Appl. No.: 13/001,833

(22) PCT Filed: Jul. 3, 2009

(86) PCT No.: PCT/GB2009/001657
§ 371 (c)(1),
(2), (4) Date: May 26, 2011

(87) PCT Pub. No.: WO2010/001125
PCT Pub. Date: Jan. 7, 2010

(65) Prior Publication Data
US 2011/0308968 A1    Dec. 22, 2011

(30) Foreign Application Priority Data

Jul. 3, 2008 (GB) .................................. 0812328.3
Dec. 10, 2008 (GB) .................................. 0822525.2

(51) Int. Cl.
*C01B 31/02* (2006.01)
*B82Y 30/00* (2011.01)
*B82Y 40/00* (2011.01)
*C25D 5/02* (2006.01)
(Continued)

(52) U.S. Cl.
CPC ............. *C01B 31/0273* (2013.01); *B82Y 30/00* (2013.01); *B82Y 40/00* (2013.01); *C25D 3/665* (2013.01); *C25D 5/02* (2013.01); *C25D 9/04* (2013.01); *C25D 13/02* (2013.01)

(58) Field of Classification Search
CPC .... B82Y 40/00; B81C 99/008; B82B 3/0071; B82B 3/0076; B82B 3/0095; C01B 31/0273
USPC .......................................... 204/173, 547, 456
See application file for complete search history.

(56) References Cited

U.S. PATENT DOCUMENTS 3,454,484 A *  7/1969  King, Jr. et al. ............... 204/554
3,655,525 A    4/1972  Childs
(Continued)

FOREIGN PATENT DOCUMENTS

JP          6/228824         11/1985
JP        2000-072422         3/2000
(Continued)

OTHER PUBLICATIONS

Whitten, PG; Spinks, GM; Wallace, GG. "Mechanical properties of carbon nanotube paper in ionic liquid and aqueous electrolytes" Carbon. Apr. 28, 2005. Volume 43, Issue 9. pp. 1891-1896.*

(Continued)

*Primary Examiner* — Keith Hendricks
*Assistant Examiner* — Steven A. Friday
(74) *Attorney, Agent, or Firm* — Baker & Hostetler LLP

(57) ABSTRACT

A method for dispersing nanomaterial comprising an electrochemical process, a solution of dispersed nanomaterial, comprising individual charged nanomaterial at a concentration of about 0.1 mgm$^{-1}$ or more and a solvent and an electrochemical cell are described.

32 Claims, 2 Drawing Sheets

Figure 1A:
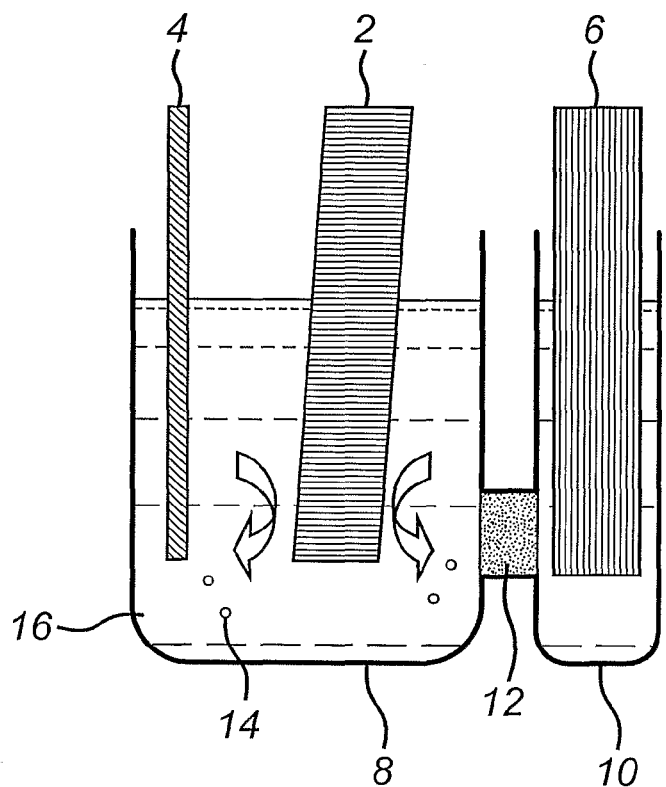

(51) Int. Cl.
C25D 9/04 (2006.01)
C25D 13/02 (2006.01)
C25D 3/66 (2006.01)

(56) References Cited

U.S. PATENT DOCUMENTS

| | | | |
|---|---|---|---|
| 2003/0077515 | A1 | 4/2003 | Chen et al. |
| 2003/0102222 | A1 | 6/2003 | Zhou et al. |
| 2003/0168385 | A1 | 9/2003 | Papadimitrakopoulos |
| 2004/0071624 | A1 | 4/2004 | Tour et al. |
| 2005/0121309 | A1* | 6/2005 | Chhowalla et al. ........... 204/173 |
| 2006/0063464 | A1 | 3/2006 | Kang et al. |
| 2006/0192475 | A1 | 8/2006 | Lee et al. |
| 2007/0098620 | A1 | 5/2007 | Khabashesku et al. |
| 2007/0189954 | A1 | 8/2007 | Penicaud et al. |
| 2007/0196262 | A1 | 8/2007 | Billups et al. |
| 2007/0224084 | A1 | 9/2007 | Holmes et al. |
| 2008/0099339 | A1* | 5/2008 | Zhou et al. .................... 205/147 |
| 2008/0245671 | A1* | 10/2008 | Balagopal et al. ............ 205/510 |
| 2008/0271606 | A1 | 11/2008 | Holmes et al. |
| 2001/0124790 | | 5/2011 | Penicaud |

FOREIGN PATENT DOCUMENTS

| | | |
|---|---|---|
| JP | 2000/724222 | 3/2000 |
| JP | 2000/347478 | 12/2000 |
| JP | 2001/319560 | 11/2001 |
| JP | 2003/212526 | 7/2003 |
| JP | 2004/043269 | 2/2004 |
| JP | 2005/015243 | 1/2005 |
| JP | 2005/104750 | 4/2005 |
| JP | 2005-519201 | 6/2005 |
| JP | 2006/064693 | 3/2006 |
| JP | 2007/520326 | 7/2007 |
| JP | 2008/055375 | 3/2008 |
| JP | 2009/0196840 | 9/2009 |
| WO | WO 03/053846 | 7/2003 |
| WO | WO 03/075372 | 9/2003 |
| WO | WO 03/084869 | 10/2003 |
| WO | WO 2005/014889 | 2/2005 |
| WO | WO 2005/019096 | 3/2005 |
| WO | WO 2008/054411 | 5/2005 |
| WO | WO 2005/090233 | 9/2005 |
| WO | WO 2006/028704 | 3/2006 |
| WO | WO 2007/078082 | 7/2007 |
| WO | WO 2007/101907 | 9/2007 |
| WO | WO 2007/103356 | 9/2007 |
| WO | WO 2007/130869 | 11/2007 |
| WO | WO 2008/111735 | 9/2008 |
| WO | WO 2008/140623 | 11/2008 |
| WO | WO 2010/001128 | 1/2010 |

OTHER PUBLICATIONS

Kraus, Charles A. "Solutions of Metals in Non-Metallic Solvents. VI. The Conductance of the Alkali Metals in Liquid Ammonia" Journal of the American Chemical Society. Apr. 1921. Volume 43, Issue 4. pp. 749-770.*
Li et al., "Highly-Ordered Carbon Nanotube Arrays for Electronics Applications", Applied Physics Letters, Jul. 19, 1999, 75(3), 367-369.
Mathur et al., "Optical Characterization of Single Walled Carbon Nanotubes Dispersed in Sodium Cholate and Sodium Dodecyl Sulfate", $2^{nd}$ 2008 IEEE International Nanoelectronics Conference, 2008, 968-971.
Qiu et al., "Preparation and Charaterization of Amphiphilic Multi-Walled Carbon Nanotubes", Journal of Nanopart Res, 2008, 10, 659-663.
Arnold et al., "Sorting carbon nanotubes by electronic structure using density differentiation", Nature Nanotechnology, Oct. 2006, 1(1), 60-65.
Banerjee et al., "Demonstration of Diameter-Selective Reactivity in the Sidewall Ozonation of SWNT's by Resonance Raman Spectroscopy", Nano Letters, May 2004, 4(8), 1445-1450.
Bauer et al., "Measurements of single-wall nanotube dispersion by size exclusion chromatography", J. Phys. Chem. C, 2007, 111, 17914-17918.
Baughman et al., "Carbon Nanotubes—the Route Toward Applications", Science, Aug. 2002, 297(5582), 787-792.
Boccaccini et al., "Electrophoretic deposition of carbon nanotubes", Carbon, Dec. 2006, 44(15), 3149-3160.
Chen et al., "Solution properties of single-walled carbon nanotubes", Science, 1998, 282, 95-98.
Coleman et al., "Towards Solutions of Single-Walled Carbon Nanotubes in Common Solvents", Adv. Mater, May 2008, 20(10), 1876-1881.
Dresselhaus et al., "Raman spectroscopy of carbon nanotubes", Physics Reports, 2005, 409, 47-99.
Ericson et al., "Macroscopic, Neat, Single-Walled Carbon Nanotube Fibers ", Science, Sep. 2004, 1447, 1446-1451.
Fagan et al., "Comparative Measures of Single-Wall Carbon Nanotube Dispersion". J. Phys. Chem. B, Sep. 14, 2006, 110, 23801-23805.
Giordani et al., "Fabrication of stable dispersions containing up to 70% individual carbon nanotubes in a common organic solvent", Phys Stat Solidi B, Apr. 2006, 243(13), 3058-3062.
Girishkumar et al., "Carbon Nanostructures in Portable Fuel Cells: Single-Walled Carbon Nanotube Electrodes for Methanol Oxidation and Oxygen Reduction", J. Phys. Chem. B, Jul. 2004, 108(52), 19960-19966.
Gu et al., "In situ Raman studies on lithiated single-wall cabon nanotubes in liquid ammonia", Chem. Phys, Letts 410, May 4-6, 2005, 467-470.
Hough et al., "Structure of Semidilute Single-Wall Carbon Nanotube Suspensions and Gels", Nano Letters, Sep. 2006, 6(2), 313-317.
Howard et al., "Formation of giant salvation shells around fulleride anions in liquid ammonia", J. Am. Chem. Soc., Jun. 2004, 126(41), 13228-13229.
Jorio, "Characterizing carbon nanotube samples with resonance Raman scattering", New Phys., A, Oct. 5, 2003, 139.1-139.17.
Kavan et al., "Electrochemical Tuning of Electronic Structure of Single-Walled Carbon Nanotubes; In-situ Raman and Vis-NIR Study", J. Phys. Chem. B, 2001, 105(44), 10764-10771.
Kim et al., "Selective Functionalization and Free Solution Electrophoresis of Single-Walled Carbon Nanotubes: Separate Enrichment of Metallic and Semiconducting SWNT", Chemistry of Materials, Aug. 2007, 19(7), 1571-1576.
Krupke et al., "Separation of Metallic from Semiconducting Single-Walled Carbon Nanotubes", Science 300, Jul. 2003, 301, 344-347.
Liang et al., "A convenient route to functionalized carbon nanotubes", Nano Letters Am. Chem. Soc. USA, Apr. 2004, 4(7), 1257-1260.
Liang et al., "Structure of dodecylated single-walled carbon nanotubes", J. Am. Chem. Soc., May 2005, 127(40), 13941-13948.
Maeda, "Large-Scale Separation of Metallic and Semiconducting Single-Walled Carbon Nanotubes", J. Am. Chem. Soc., Mar. 2005, 127(29), 10287-10290.
O'Connell et al., "Band Gap Fluorescence from Individual Single-Walled Carbon Nanotubes", Science, Jul. 2002, 297, 593-596.
Okazaki et al., "Absolute potential of the Fermi level of isolated single-walled carbon nanotubes", Phy Rev, B, 2003, 68(3), 035434-1 to 6.
Pacios et al., "Electrochemical behaviour of rigid carbon nanotube composite electrodes", J. Electranalytical Chem, Jul. 15, 2008, 619-620, 117-124.
Patterson, "The Scherrer Formula for X-Ray Particle Size Determination", Phys. Rev., Jul. 1939, 56(10), 978-982.
Peng et al., "Optically active single-walled carbon nanotubes", Nature Nanotechnology, 2007, 2(6), 361-365.
Penicaud et al., "Spontaneous Dissolution of a Single-Wall Carbon Nanotube Salt", J. Am. Chem. Soc., 2005, 127, 8-9.
Prato et al., "Soluble Carbon Nanotubes", Chem. Eur. J., 2003, 9(17), 4000-4008.
Ramesh et al., "Dissolution of Pristine Single Walled Carbon Nanotubes in Superacides by Direct Protonation", J. Phys. Chem. Soc., B, 2004, 108(26), 8794-8798.

(56) References Cited

OTHER PUBLICATIONS

Rols et al., "Diffraction by finite-size crystalline bundles of single wall nanotubes", Eur. Phys. J., B, 1999, 10, 263-270.

Stephenson et al., "Highly Functionalized and soluble multi-walled carbon nanotubes by reductive alkylation and arylation: The billups reaction", Chemistry of Materials, Apr. 2006,18(19), 4658-4661.

Strano et al., "Electronic Structure Control of Single-Walled Carbon Nanotube Functionalization", Science, Sep. 2003, 301, 1519-1523.

Sun et al.,"Axial Young's modulus prediction of single-walled carbon nanotube arrays with diam", App. Phys. Lett, 87, May 2005, 193101-193101-3.

Wang et al., "Processing and property investigation of single-walled carbon nanotube (SWNT) buckypaper/epoxy resin matrix nanocomposites", Composites Part A: Applied Science and Manufacturing, 2004, 1225-1232.

Whitten et al., "Mechanical properties of carbon nanotube paper in ionic liquid and aqueous electrolytes", Carbon, Aug. 2005, 43(9), 1891-1896.

Wunderlich et al., "Preferred functionalization of metallic and small-diameter single walled carbon nanotubes via reductive alkylation", J. Mat. Chem., The Royal Society of Chemistry, Oct. 2008, 18, 1493-1497.

Yan et al., "Individually dispersing single-walled carbon nanotubes with novel neutral pH water-soluble chitosan derivatives", J. Phys. Chem C, 2008, 112(20), 7579-7587.

Zheng et al., "Enrichment of single chirality carbon nanotubes", J. Am. Chem. Soc., May 2007, 129(19), 6084-6085.

Zheng et al., "Structure-Based Carbon Nanotube Sorting by Sequence-Dependent DNA Assembly", Science, 2003, 302, 1545-1548.

Hilding et al., "Dispersion of Carbon Nanotubes in Liquids", Journal of Dispersion Science and Technology, 2003, 24(1), 41 pages.

Pekker et al., "Hydrogenation of Carbon Nanotubes and Graphite in Liquid Ammonia", J. Phys. Chem. B, 2001, 105, 7938-7943.

Duesberg et al., "Chromatographic Size Separation of Single/Wall Carbon Nanotubes", Applied Physics A Materials Science & Processing, Jul. 1998, 67(1), 117-119.

\* cited by examiner

METHOD FOR SEPARATING NANOMATERIALS

CROSS-REFERENCE TO RELATED APPLICATIONS

This application is the National Stage of International Application No. PCT/GB2009/001657, filed Jul. 3, 2009, which claims the benefit of Great Britain application number 0812328.3, filed Jul. 3, 2008, and Great Britain application number 0822525.2, filed Dec. 10, 2008, the disclosures of which are incorporated herein by reference in their entirety.

The present invention relates to methods for dispersing and separating nanomaterials, in particular nanotubes. In particular, the present invention provides methods wherein nanomaterial may be dispersed and separated using an electrochemical process.

Carbon nanotubes are an important material system, providing unique properties including the highest known thermal conductivity, the highest mechanical strength, the large current density capacity, and a range of important (opto)electronic characteristics. As well as fundamental scientific interest, nanotubes are proposed for an enormous range of applications, ranging from high performance composite materials, to transparent conductors, solar cells, and nanoelectronics as described in Baughman, R. H., A. A. Zakhidov, and W. A. de Heer, Science, 2002. 297(5582): p. 787-792. However, there are a number of critical obstacles to be overcome before nanotubes can be exploited to their full potential.

Carbon nanotubes can be subdivided into two groups: single walled carbon nanotubes (SWNTs) and multiwalled carbon nanotubes (MWNTs). SWNTs are pure carbon tubular molecules that can be thought of as a single 'rolled up' graphene sheet. SWNTs are typically about 1-1.5 nm in diameter, and their properties depend on their diameter and the angle at which they are rolled up from the graphene sheet (the chiral angle). Multiwalled carbon nanotubes consist of several concentric layers of SWNTS.

The definitions of nanotubes can be extended to include a number of variants or derivatives familiar to those skilled in the art including, for example, the presence of defects (vacancies, other rings such as heptagons, and altered via hybridisation), endohedral material (filling of the hollow core with other substances), chemical functionalisation, di(or poly)merisation, and more complex topologies.

As grown, nanotube materials are heterogeneous, containing both impurities, and intrinsically a mixture of different nanotube species. The electronic and optical properties of carbon nanotubes depend on their diameter and helicity (the angle between the graphite lattice and the nanotube axis). In this regard, with reference to SWNTs, each species can be labelled with an (m,n) index. In typical SWNT samples, approximately one third are metallic and two thirds are semiconducting as described in Meyyappan, M., 2005: CRC Press. While progress has been made in synthesising materials with more of one type than another, to date, no pure syntheses are known.

The importance of being able to separate the two different SWNT types in the future of the material should not be underestimated. For example, semiconducting tubes must alone be used to produce good field-effect transistors and only metallic nanotubes must be present if low-resistance materials are to be produced, for example for transparent films (Kim, W. J. et al. Chemistry of Materials, 2007. 19(7): p. 1571-1576).

It is therefore clear that, before the optoelectronic properties of carbon nanotubes can be used to their full potential, a cheap and scalable method of nanotube separation by electronic character is required. In addition, most nanotube samples are contaminated with metal catalysts, catalyst supports, or other types of amorphous, nanoparticulate, or graphitic carbon. Processing the material to obtain pure nanotubes is difficult, typically involving multiple oxidation, sonication, washing, and filtration steps that are time consuming, damaging to the intrinsic properties of the nanotubes, and often of limited efficacy.

The difficulty in separation and purification is linked to a wider problem, specifically that nanotubes have very poor solubility or dispersibility in common solvent systems. Good dispersions/solutions of nanotubes are highly desirable for introducing nanotubes into specific applications, for example, depositing homogeneous nanotube coatings, forming electrode assemblies, and fabricating high performance composites.

Dispersion in low viscosity solutions is typically achieved using ultrasound wherein the high intensity used separates nanotube aggregates and even SWCNT bundles. However, this technique can also cause damage. Stable dispersions of unadulterated individual nanotubes are known only in a small number of solvents (e.g. NMP, DMA, etc) and at extremely low concentrations (<0.01 mg/ml, roughly <0.001 wt %) (Giordani, S., et al., Physica Status Solidi B-Basic Solid State Physics, 2006. 243(13): p. 3058-3062).

In order to prevent reagglomeration, a polymer or surfactant which can adsorb onto the exposed nanotube surfaces or become grafted due to chain scission (Shaffer, M. et al., Editor S Advani. 2006, World Scientific. p. 1-59) is usually added to the solution. Amphiphilic polymers dissolved in water, such as poly(hydroxyaminoether) (PHAE), poly(vinyl alcohol) (PVA), and PVA/poly(vinyl pyrrolidone) (PVP) have proved particularly effective, although organic systems have also been explored, based on polystyrene (PS), ultra-high molecular weight polyethylene (UHMWPE), and polypropylene (PP). A range of surfactants have been used, most commonly SDS, SDBS, and bile salts.

These non-covalent strategies are moderately effective at low concentrations, but all require intense sonication, and intrinsically contaminate the sample. Bundles of nanotubes typically remain in addition to or instead of individual nanotubes, which can only be removed by ultracentrifugation.

Direct covalent chemical functionalisation either with polymers or charged function groups has also been used, but is particularly damaging to the intrinsic properties of the nanotubes.

The most promising methods of dissolving individual nanotubes rely on chemically charging the nanotubes under aggressive redox conditions, either protonating in superacids (Ramesh, S., et al., Journal of Physical Chemistry B, 2004. 108(26): p. 8794-8798) or reducing using sodium napthalide in DMF (Penicaud, A., et al., Journal of the American Chemical Society, 2005. 127(1): p. 8-9).

At present there are a number of different techniques used to separate nanotubes by their electronic properties with varying degrees of success. All require the preparation of individual nanotube (usually SWNT) suspensions by sonication and ultracentrifugation, as a prerequisite. Dielectrophoresis separates metallic and semiconducting SWNTs based on their different polarisability (Krupke, R., et al., Science, 2003. 301(5631): p. 344-347). The method is reported to produce only an 80% enrichment and is limited by the high cost of the microelectrode, the very small sample size, and the problems associated with producing good quality initial solutions.

Density gradient ultracentrifugation can be used to sort minute quantities of carbon nanotubes by both their diameter and electronic type (Arnold, M. S., et al., Nature Nanotechnology, 2006. 1(1): p. 60-65), using the differences in the buoyant densities. However, multiple cycles of ultracentrifugation are required hindering the commercial viability of this process due to its costly nature.

Simpler methods are based on a combination of dispersion and centrifugation, commonly involving a solution of amines (Maeda, Y., et al., Journal of the American Chemical Society, 2005. 127(29): p. 10287-10290) but yield only modest enrichment rather than full separation.

Anion exchange chromatography has been used to separate SWNTs wrapped in DNA (Zheng, M. and E. D. Semke, Journal of the American Chemical Society, 2007. 129(19): p. 6084 onwards). Although this technique is good for producing small quantities of separated tubes, this approach is severely limited by the high cost of the DNA used in the wrapping process and of the anion exchange chromatography. The need to completely remove the DNA for many potential applications is an additional drawback.

A variety of chemical techniques have also been developed to separate SWNTs. Peng, X., et al., Nature Nanotechnology, 2007. 2(6): p. 361-365 describes the use of diporphyrins or 'nano tweezers' to separate SWNTs of different helicities. Kim, W. J. et al. Chemistry of Materials, 2007. 19(7): p. 1571-1576 describes the use of diazonium salts to selectively functionalise metallic nanotube after which they could be separated by electrophoretic means. Ozonolysis can also by employed to separate nanotubes by diameter as described in Banerjee, S. et al. Nano Letters, 2004. 4(8): p. 1445-1450. Wunderlich, D., et al. Journal of Materials Chemistry, 2008 describes that alkylation in liquid ammonia selectively functionalises metallic tubes.

Although some of these techniques are more effective than others, they all involve batch processes, very small quantities, and inherently damage the structure of the nanotubes by functionalisation.

Therefore, it is apparent that there is a need for a simple and effective method, which can be run in a continuous manner, for separating nanomaterials and which does not suffer from the disadvantages identified above.

In this regard, the present inventors have surprisingly found that effective dissolution and separation of nanomaterials, in particular, nanotubes can be achieved by use of an electrochemical process.

By far the most common electrochemical uses of nanotubes are as inert electrodes in electrochemical devices such as capacitors and fuel cells or as microelectrodes. In these contexts, the redox characteristics of the nanotubes are ignored. The redox electrochemistry of nanotubes attached to solid supports has been studied previously as described in Kavan, L., et al., Journal of Physical Chemistry B, 2001. 105(44): p. 10764-10771, but never for the purposes of dissolution or separation. On the other hand, redox purification is well known for atomic species and is used in large industrial processes, for example for the purification of copper as described in Pletcher, D. and D. Walsh, *Industrial Electrochemistry.* 1993: Blackie Academic and Professional. The application of redox electrochemistry to the purification of discrete nanomaterials is a surprising development.

In a first aspect, the present invention provides a method for dispersing nanomaterial comprising an electrochemical process. Advantageously, it has been found that where such a process is employed, it is possible to disperse nanomaterials effectively while avoiding causing damage to the nanomaterial. In particular, the present invention provides a scalable, cheap and potentially continuous method for separating large quantities of nanomaterials.

Furthermore, by controlling the conditions under which the electrochemical process is performed, it is possible to selectively disperse the nanomaterial. For example, where the nanomaterial comprises nanotubes, by controlling the conditions under which th electrochemical process is performed, it is possible to selectively disperse nanotubes having different properties. In this regard, it is possible to separate, nanotubes on the basis of their electronic characteristics, e.g. semiconducting nanotubes from metallic nanotubes, by size or by helicity.

In a further aspect, the present invention provides a solution of dispersed nanomaterial, comprising individual nanomaterial at a concentration of about 0.1 mgml$^{-1}$ or more and a solvent. A high concentration of dispersed, individual nanomaterial is desirable for further manipulation. Prior to the present invention, it had not previously been possible to obtain solutions having such a high concentration of nanomaterial, without needing to use additional surfactants, surface modifiers, chemical functionalisation or protonation.

In one embodiment, the present invention provides a solution of dispersed nanotubes, comprising individual charged nanotubes at a concentration of about 0.1 mgml$^{-1}$ or more and a solvent.

In a further aspect, the present invention provides an electrochemical cell comprising a working electrode, a plurality of counter electrodes and an electrolyte, wherein the working electrode comprises nanomaterial. Preferably, in use, the potential between each of the plurality of counter electrodes and the working electrode is different.

In the method of the present invention, a nanomaterial is dispersed by an electrochemical process.

The term "nanomaterial" as used herein refers to materials having morphological features of about 0.1 μm or less in at least one dimension. Accordingly, the term encompasses nanotubes, nanofibres and nanoparticles.

In some embodiments, the nanomaterial is an assembly of nanotubes, nanofibers and/or nanoparticles. The method of the present invention allows for the dispersion of such assemblies.

The term "nanoparticle" is used to refer to a particle which has a discrete crystalline structure which can be oxidised or reduced electrochemically as a whole without degrading the inherent atomic structure of the particle. Examples of suitable nanoparticles include nanoparticles comprised of noble metal atoms, such as, for example, platinum or gold.

The term "nanofibre" is used to refer to a fibre having a diameter of about 0.1 μm or less.

In some embodiments, the nanomaterial comprises nanotubes or nanofibres. Preferably, the nanomaterial comprises nanotubes. Preferably the nanomaterial comprises carbon nanotubes.

In one embodiment, the carbon nanotubes may be doped with boron and/or nitrogen in order to adjust the electrical conductivity of the carbon nanotubes. Typically dopant concentrations will be about 1 atomic % but may be significantly higher or lower.

The nanotubes used in the method of the present invention may be SWNTs or MWNTs, preferably SWNTs. Preferably, the nanotubes are carbon nanotubes. The nanotubes may have a range of diameters. Typically, for SWNTs, the nanotubes will have diameters in the range from about 0.4 to about 3 nm. Where the nanotubes are MWNTs, the diameters will preferably be in the range from about 1.4 to about 100 nm. Preferably, the carbon nanotubes are SWNTs. Suitable nanotubes can be obtained commercially from, for example, SWeNT, Carbon Nanotechnologies, Inc., Carbolex, Inc. and Thomas Swan Ltd.

While the details which follow herein focus on nanotubes, the method of the invention applies to other nanomaterials where the redox potentials may be controlled by size or composition, and selective separation is required. Redox active particles of low intrinsic conductivity may need to be supported on a porous conductive framework.

The term "electrochemical process" as used herein refers to a process wherein a chemical reaction takes place at the interface of an electron conductor (an electrode) and an ionic conductor (an electrolyte) and is a process which involves the transfer of a charged species between the electrode and the electrolyte.

In one embodiment, the method of the present invention comprises applying a potential between a working electrode and a counter electrode, wherein the working electrode comprises nanomaterial, such as nanotubes, and the working electrode and counter electrode form part of an electrochemical cell which further comprises an electrolyte.

The term "working electrode" as used herein refers to an electrode at the interface of which an electrochemical process of interest takes place.

The working electrode used in the method of the present invention comprises nanomaterial. In one embodiment, the working electrode may consist essentially of nanomaterial i.e. the electrode contains no other components which will materially affect the behaviour of the electrode. This purity is advantageous for several reasons. Firstly it allows for the dispersion of a large quantity of nanomaterial through a single simple process which can be easily controlled. Secondly, it makes it straightforward to monitor for the end point of the process because it will be marked by the required degree of dissolution of the working electrode. Thirdly, the system is maintained free of unwanted additional contaminants.

Electrodes which comprise nanomaterial are known in the art. For example, "bucky paper" or other film carbon nanotube electrodes have been used previously as inert electrodes in an electrochemical cell as described in *J. Phys Chem B*, 108 (52) 19960-19966, 2004. "Bucky paper" may be obtained commercially from Nanolab, Inc., MA, USA. Electrodes which comprise nanomaterial may be produced by conventional techniques with which the person skilled in the art will be familiar. For example, such electrodes may be produced by filtration/dispersion of nanomaterial-containing solutions as described in Wang et al., Composites Part A: Applied Science and Manufacturing, (35) 10, 1225-1232 (2004).

The underlying principle of the electrochemical technique of the present invention is to apply a relatively large potential between a working electrode which comprises nanomaterial and a counter electrode until the nanomaterial becomes sufficiently highly charged that it spontaneously dissolves. The process may either use a large positive voltage to remove electrons from (oxidise) the nanomaterial, leading to a solution of positively charged nanomaterial, or use a large negative voltage to add electrons to (reduce) the nanomaterial, providing a solution of negatively charged nanomaterial.

Where the working electrode comprises nanotubes, preferably a large negative potential is applied such that the nanotubes are reduced. The reduction is preferred, as the required potential is more easily accessed in standard solvent windows, and the resulting carbon nanotubide ions are more easily solvated. Where the nanotubes are reduced, the working electrode is a cathode and the counter electrode is an anode.

As indicated above, in the method of the present invention, a large potential is applied between the working electrode and the counter electrode. The potential applied between the working electrode and the counter electrode may be adjusted depending on the ionisation energy of the nanomaterial. Where a negative potential is applied, preferably the potential applied is about −0.6 V or a more negative potential, about −0.8 V or a more negative potential, preferably about −1.0 V or a more negative potential, preferably about −1.5 V or a more negative potential, preferably about −2.0 V or a more negative potential, preferably about −2.5 V or a more negative potential as measured relative to a standard hydrogen electrode. Preferably the potential applied is in the range from about −1 to about −2 V as measured relative to a standard hydrogen electrode.

Where a positive potential is applied, preferably the potential applied is about 1.0 V or more, preferably about 1.1 V or more, preferably about 1.2 V or more, preferably about 1.3 V or more, preferably about 1.5 V or more as measured relative to a standard hydrogen electrode. Preferably the voltage applied is about 3 V or less, about 2.5 V or less, about 2.0 V or less as measured relative to a standard hydrogen electrode.

The steady state current correlates with the rate of dissolution of the nanomaterials, and may be maximised by adjusting the composition of the electrolyte and the surface area of the working electrode, as well as the applied potential.

The time for which a potential is applied between the working electrode and the counter electrode is not particularly limited, other than by consumption of the working electrode, which may be replenished. In one embodiment, the potential may be applied for a time in the range from about 1 to about 16 hours.

The dimensions of the working electrode are not particularly limited. In some embodiments, the working electrode may have a surface area in the range from about 0.2 to about 1.0 $cm^2$. In other embodiments, the surface area may be significantly larger, particularly where the method is being operated on a commercial scale.

The electrolyte is one that stabilises charged nanomaterials. The electrolyte may be formed in situ in the electrochemical cell by addition of a suitable salt to a solvent. Standard, wide stability salts used for dry organic electrolyte systems can be used, including sodium tetraphenyl borate, tetrabutylammonium hexafluorophosphate and lithium perchlorate.

The person skilled in the art will be familiar with suitable solvents. In particular, polar, aprotic dry solvents are preferred. Suitable solvents for charged nanomaterials include but are not limited to dry (water-free) and oxygen-free dimethyl formamide (DMF), dimethylacetamide (DMA) and N-methylpyrolidone (NMP).

Alternatively, a nanomaterial-based electrolyte, such as a nanotube-based electrolyte can be used, for example, an alkali metal nanotubide salt, either prepared ex situ by direct reaction or in situ by the addition of alkali metal.

In one embodiment, the nanotube-based electrolyte may be prepared ex situ by contacting nanotubes, which may be obtained commercially, with an electronic liquid comprising a metal and an amine solvent The term "electronic liquid" is used herein to describe the liquids which are formed when a metal, such as an alkaline earth metal or an alkali metal, for example, sodium, dissolves without chemical reaction into a polar solvent—the prototypical example being ammonia. This process releases electrons into the solvent forming a highly reducing solution. Without wishing to be bound by theory, these solutions dissolve nanotubes, based on two factors. First, the electron of the carbon species means that they form negatively charged anions. Second, these negatively charged anions are stably dispersed due to electrostatic repulsion.

The metal used is a metal which dissolves in an amine to form an electronic liquid. The person skilled in the art will be familiar with appropriate metals. Preferably, the metal is selected from the group consisting of alkali metals and alkaline earth metals. Preferably, the metal is an alkali metal, in particular, lithium, sodium or potassium. Preferably, the metal is sodium.

It is advantageous to control carefully the amount of metal included in the solution. Too much metal present in the electronic liquid washes out (saturates) the possibility of selective charging and prevents dispersion of the nanotubes to form a nanotube-based electrolyte by screening the electrostatic repulsions between the carbon species. Therefore, preferably the metal is present in an amount such that the ratio of metal atoms in the electronic liquid to carbon atoms in the carbon nanotubes with which the electronic liquid is contacted is about 1:4 or less, preferably about 1:6 or less, preferably about 1:8 or less, preferably about 1:10 or less, preferably about 1:15 or less, preferably about 1:20 or less. In some embodiments, the metal is present in an amount such that the ratio of metal atoms in the electronic liquid to carbon atoms in the carbon nanotubes with which the electronic liquid is contacted is in the range from about 1:3 to about 1:10, about 1:3 to about 1:8, about 1:3 to about 1:6, about 1:3 to about 1:5, preferably about 1:4. The number of carbon atoms in the nanotubes can be determined by simple calculations with which the person skilled in the art will be familiar.

The electronic liquid is formed by dissolving the metal in an amine solvent. In some embodiments, the amine solvent may be a $C_1$ to $C_{12}$ amine, a $C_1$ to $C_{10}$ amine, a $C_1$ to $C_8$ amine, a $C_1$ to $C_6$ amine, a $C_1$ to $C_4$ amine. The amine solvent is preferably selected from ammonia, methylamine or ethylamine. Preferably, the amine solvent is ammonia. In one embodiment, the metal is sodium and the amine solvent is ammonia.

It is preferred to exclude air and moisture from the system by ensuring that all materials are dry and oxygen-free. In principle, a small concentration of contaminant can be removed by electrochemical reaction, but it is preferable to remove contaminants in advance.

In the method of the present invention, nanomaterial is dissolved from the working electrode by applying a potential between the working electrode and the counter electrode. The electrochemical cell may contain a plurality of counter electrodes. The counter electrode used in the method of the present invention is not particularly limited, but is preferably electrochemically inert under the conditions employed. In this regard, the person skilled in the art will be familiar with appropriate counter electrodes. Examples of suitable counter electrodes include glassy carbon, graphite, platinum and nanotube papers.

In one embodiment, the electrochemical cell may further comprise a reference electrode or pseudo reference electrode. This addition is advantageous because it allows for maximum control, particularly in small scale experiments. In the solvent/electrolyte systems used in the method of the present invention, standard reference electrodes, most usually designed for or containing aqueous systems, are not always readily available, so a pseudo-reference electrode, such as a platinum wire, can be used. Some reference electrode systems such $Ag/AgNO_3$ are also available.

In one embodiment of the present invention, the working and counter electrodes are arranged in separate compartments linked by a suitable electrochemical membrane or separator. Suitable electrochemical membranes and separators include porous, for example, fluorinated polymer films, and glass or other inert fibre mats. In such an arrangement, the electrolyte salt or counter electrode material is oxidised (or reduced) at the counter electrode to balance the reduction (or oxidation) of nanomaterial at the working electrode. The solution of charged, dispersed nanomaterial can be collected from the working electrode compartment. Where the process is to be run in a continuous fashion, it may be necessary to add further additions of electrolyte or counter electrode material.

In an alternative embodiment, the working and counter electrodes are contained in a single compartment. In this arrangement, the nanomaterial is dissolved from the working electrode and subsequently deposited onto the counter electrode(s). The process can continue until the nanomaterial provided in the working electrode is exhausted, or until a selected fraction of the nanomaterial provided in the working electrode is exhausted. The proportion of nanomaterial which has been dissolved from the working electrode can be determined by monitoring the weight of the working electrode as the electrochemical reaction progresses or by measuring the total charge which has passed through the electrochemical cell by integrating current over time. The deposited nanomaterial can be collected from the counter electrode, for example, by mechanical means to produce a powder or by further electrochemical processing to produce a dispersion.

Preferably, the electrochemical cell used in the method of the present invention is arranged such that the working and counter electrode(s) are contained in the same compartment.

As noted above, nanomaterials such as nanotubes are heterogeneous, and the various components have different redox potentials as described in Okazaki, K. et al. Physical Review B, 2003, 68(3). Accordingly, by selecting the potential of the working electrode, different fractions of nanotube-containing material may be dissolved in the method of the present invention. The invention thus provides a mechanism for separating and purifying nanomaterials, in particular, nanotube-containing materials. This selectivity may be achieved in one of two ways. In one embodiment, separation and purification may be achieved by controlling the dissolution of the nanomaterial-containing working electrode. This can be done by controlling the potential applied between the working electrode and the counter electrode. For example, nanoparticulate carbons may be charged first and dissolved away, leaving an enriched (purified) nanotube working electrode. Similarly, metallic or diameter-dependent semiconducting nanotubes may be dissolved separately, optionally in a sequence of applied potential steps of gradually increasing magnitude. Where separation is achieved by controlling dissolution of the working electrode, preferably the potential applied between the working electrode and the counter electrode is sufficient to dissolve at least about 1%, at least about 5%, at least about 10%, at least about 15%, at least about 20%, at least about 25%, at least about 30%, at least about 35%, at least about 40%, at least about 45%, at least about 50%, at least about 60%, at least about 70%, at least about 80%, at least about 85%, at least about 90%, at least about 95%, at least about 98%, at least about 99% of the nanomaterial of the working electrode. In this embodiment, the product obtained is a solution of dispersed, individual, charged nanomaterial which has optionally been separated on the basis of size, helicity and/or electronic character by adjusting the potential applied between the working electrode and counter electrode so as to control dissolution of the nanomaterial-containing working electrode.

In an alternative embodiment, separation and purification of the nanomaterial may be achieved by controlling the deposition of the dissolved nanomaterial onto the counter electrode. In this embodiment, preferably, a sufficiently large potential is applied between the working electrode and the counter electrode in order to dissolve at least about 50%, at least about 60%, at least about 70%, at least about 80%, at least about 85%, at least about 90%, at least about 95%, at least about 98%, about 100% of the nanomaterial of the working electrode. The electrochemical cell may comprise a plurality of counter electrodes, such that the potential between the working electrode and each subsequent counter electrode is different. The differing redox potentials of the charged species will cause them to be selectively deposited at different counter electrodes, allowing for separation and purification of the nanomaterial from which the working electrode is comprised. Preferably, the counter electrodes are spatially arranged in sequence in terms of distance from the working electrode, such that the dissolved species move sequentially from smallest to greatest magnitude potential. This arrangement allows for the deposition of a pure species at each counter electrode as it reaches the potential required for deposition.

The invention thus provides a scalable, cheap and potentially continuous method for separating large quantities of nanomaterial. The purified nanomaterial produced by the method of the present invention has immediate application in such fields as solar cells, transistors and sensing. In particular, the nanomaterial dispersion can be used for variety of purposes, including preparation of coatings, composites, and synthesis of functionalised nanotubes using reactions developed for nanotubes charged by chemical means.

By using the method of the present invention, it is possible to obtain a solution of dispersed, individual, charged nanomaterial.

Where the working electrode comprises nanotubes, the product of the method of the present invention may be a solution of dispersed, charged, individual nanotubes. The person skilled in the art will be familiar with techniques which may be used to confirm the presence of individualised (debundled) nanotubes. An example of a suitable technique is small angle neutron scattering (SANS) as described in J. A. Fagan et al. J Phys Chem B., (2006), 110, 23801.

SANS is a powerful technique for probing the structure of SWNTs in solution. More specifically, SANS can be used to determine whether the SWNTs are present as isolated species or in bundles or clusters. SANS provides information of the structure of large particles in solution (in the range from 1 to 1000 nm). The SANS intensity I(Q) is proportional to $Q^{-D}$, where D is the fractal dimension of the tube. Thus, the expected SANS pattern for fully dispersed rod-like objects (i.e. $D^{-1}$ behaviour. Otherwise, non-mono-dispersions of SWNTs, i.e. those consisting of aggregates or networks of rods exhibit a larger fractal dimensions, typically from 2 to 4.

It has been found that, where the method of the present invention is employed, it is possible to obtain surprisingly high concentrations of nanomaterials, in particular nanotubes. More specifically, prior to the present invention it was believed that, due to thermal equilibrium being reached, the highest concentration of individual nanotubes which could be obtained in solution, in the absence of surface modifiers chemical functionalisation, or protonation, is 0.01 $mgml^{-1}$. However, the present inventors have achieved concentrations of greater than about 0.01 $mgml^{-1}$. In some embodiments, the concentration of individual nanotubes is about 0.1 $mgml^{-1}$ or more, about 0.5 $mgml^{-1}$ or more, about 1 $mgml^{-1}$ or more, about 5 $mgml^{-1}$ or more, about 10 $mgml^{-1}$ or more, about 50 $mgml^{-1}$ or more, about 100 $mgml^{-1}$ or more.

A further advantage associated with the present invention is that selectivity is achieved by controlling the conditions under which the electrochemical process is performed. More specifically, the nature of the method is such that metallic carbon nanotubes are charged in preference to semi-conducting nanotubes. The effect is due to the variable electron affinity of SWNTs which depends on type, diameter, and helicity.

The types of nanotubes which are present in the solution can be determined by Raman scattering techniques (Desselhaus et al Physics Reports (2005), 40A). Raman scattering is a powerful technique for the determination of specific types of SWNT present in a sample consisting of mixed tubes. Raman scattering is the process of inelastic light scattering via an intermediate electron with energy lost or gained from a vibronic mode (phonon) of the sample. As only a very few photons are scattered in this way (1 in $10^7$), Raman spectroscopy typically uses a laser for a high intensity beam of monochromatic light.

SWNTs are rolled up sheets of graphite and due to this tubular nature their electrons are confined in the radial direction of the tube. This quantisation leads to large spikes, called van Hove singularities, in their electronic Density of States (eDOS). If the incoming light matches the difference between these spikes, the Raman scattering is resonant. The Raman spectrum at any given wavelength is then dominated by the specific tubes which have transitions matching that wavelength in their eDOS. To predict which tubes will be in resonance with the light, a Kataura plot is often used. This graph is a plot of calculations of the transitions of different SWNTs as a function of their diameter.

Below 400 $cm^{-1}$, the Raman spectra of SWNTs are dominated by the Radial Breathing Modes (RBM). The energy of this phonon is inversely proportional to the diameter of the SWNT. The Raman spectra of a sample of a mixture of tubes will show a sum of the peaks from all the RBMs from the SWNTs that are resonant with the light. Therefore, knowing the laser wavelength, one can read off from the Kataura plot which tubes are present in a given sample. If one takes a sample of SWNTs and processes it chemically, then by comparing its Raman spectrum with that of the untreated tubes, the relative population increase or decrease in the RBMs provides strong evidence of the relative increase or decrease of the specific type of SWNT in the sample. Furthermore, as can be seen in the plot, transitions from metallic and semiconducting tubes are typically well separated for given energies. Thus, typically a spectrum contains reasonably clear regions of peaks corresponding to metallic and semiconducting SWNTs. In this way Raman Spectroscopy is a powerful technique in determining the extent of separation of SWNTs based on electronic character (Dresselhaus M. S. et al. Physics Reports (2005) 40).

After producing a dispersion of individual nanomaterial, preferably nanotubes, one or more further steps may be carried out in order to further separate the nanomaterial, e.g. on the basis of electronic character, size and/or helicity.

In one embodiment, the dispersed material(s) may be further separated by gradual quenching of the charge using a suitable quenching agent, including but not limited to $O_2$, $H_2O$, $I_2$, protic organic solvents and alcohols (or other protic species). As the quenching agent is added, the species with the highest energy electrons will be deposited first. By adding appropriate stoichiometric quantities, the desired fractions may be separated. For example, the fractions precipitated after neutralising predetermined amounts of the total charge may be collected.

Alternatively or in addition to chemical quenching, electrochemical methods can be used. In this case, the addition charge on the nanotube-based anions is removed by applying a small voltage to an (otherwise inert) electrode placed in the dispersion of nanotubes. By controlling the potential of the electrode, nanotubes of different electron affinities can be oxidised and precipitated onto the electrode. The electrode (or series) of working electrodes are held at fixed potential(s), in potentiostatic mode; a counter electrode may also be provided, preferably in a remote, though ionically-linked compartment at which the alkali metal ion is reduced and recovered. A reference electrode may be used to control the potential at the working electrode accurately.

Alternately, or in an additional step, the solvent (electrolyte) may gradually be removed, causing the heaviest/least charged species to deposit first. These two mechanisms allow separation by, for example, nanotube length on the one hand, and nanotube electronic character (semiconducting band gap) on the other.

Optionally, quenching agents including but not limited to RI, wherein R is a hydrocarbon group, can be used to chemically modify the carbon species. By carrying out the reaction on dispersions of individual nanotubes, an ideally uniform functionalisation is achieved over the nanotube surface (typical functionalisations occur only on the surface of nanotube bundles).

Optionally, a solution of (previously separated) carbon species can be destabilised slowly (by quenching or solvent removal) to crystallise the carbon species.

Optionally, where the nanomaterial comprises nanotubes, the partially sorted, individual dispersed nanotubes, can be further separated according to size by chomatography in a dry environment.

Optionally, the charged nanotubes can be transferred to other dry organic solvents, such as dimethyl formamide (DMF), dimethylacetamide (DMA) and N-methylpyrolidone (NMP), for further processing.

The present invention will now be described further by reference to the following figures and examples which are in no way intended to limit the scope of the invention.

FIGURES

Figure 1B:
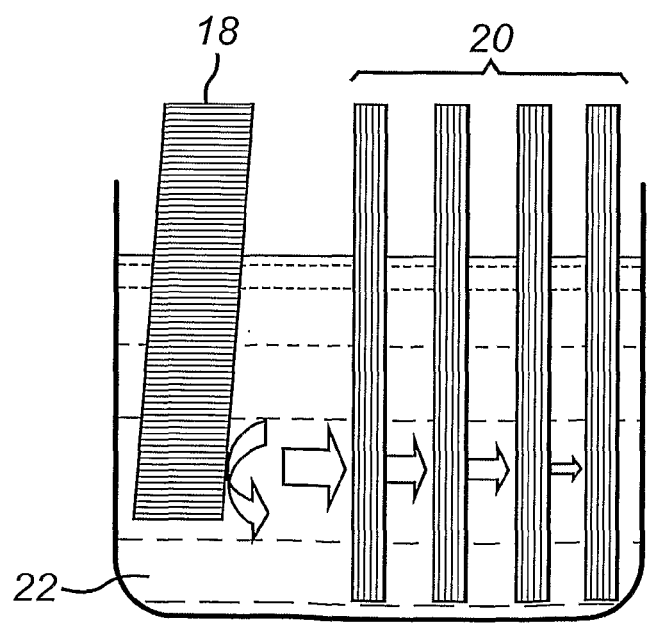
Figure 2:
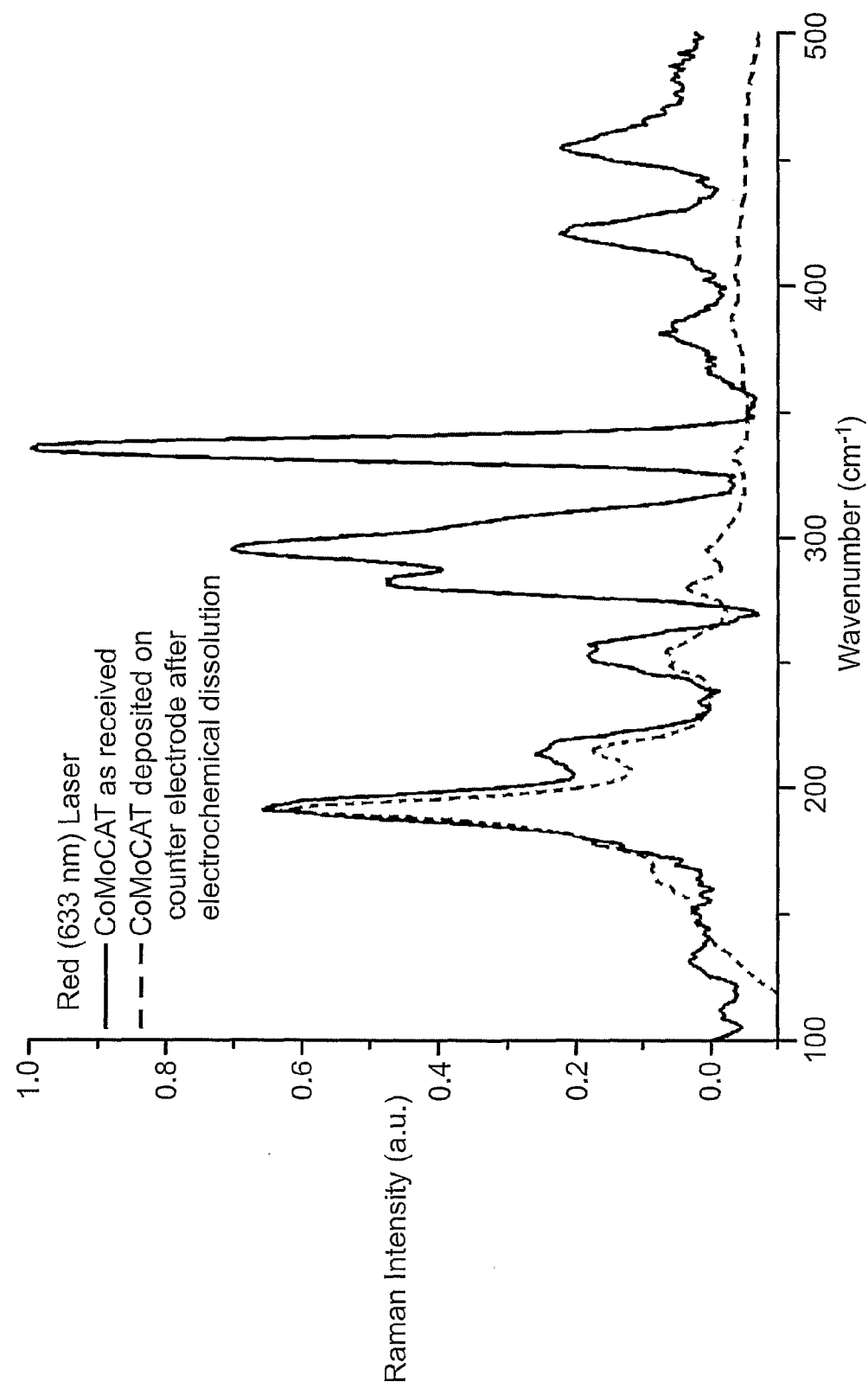

FIGS. 1A and 1B are schematic representations of two different arrangements of an electrochemical cell which may be used in the method of the present invention; and FIG. 2 shows Raman spectra of CoMoCAT SWNTs before and after applying the method of the present invention.

In FIG. 1A, a working electrode (2) comprising nanomaterial and a reference electrode (4) are positioned in one compartment (8), while a counter electrode (6) is positioned in a separate compartment (10) which is linked to the first compartment by an electrochemical membrane (12). Upon application of a potential between the working electrode and the counter electrode, nanomaterial (14) is dispersed in the electrolyte (16).

In FIG. 1B, a working electrode (18) and a series of counter electrodes (20) are arranged within the same compartment (22). Upon application of a potential between the working electrode and the counter electrode, nanomaterial is deposited on the counter electrodes.

EXAMPLE

In this example, an electrochemical cell comprising a bucky paper working electrode, a Highly Ordered Pyrolytic Graphite counter electrode, a platinum pseudo-reference electrode and sodium tetraphenyl borate in N,N-dimethylmethanamide as an electrolyte was used. The electrochemical cell was held at negative potentials to cause the SWNTs to be reduced, repel one another, overcome the Van der Waals forces that hold them together and therefore leave the bucky paper as individual nanotubes dispersed in the electrolyte. The reduced nanotubes were then deposited on the counter electrode as a thin carbon nanotube film.

The electrochemical cell was prepared and operated as follows. 10 mg of sodium tetraphenyl borate was added to a clean, dry, 25 ml, 3-neck round bottom flask containing a 6 mm glass encased magnetic stirrer bar. Using standard Schlenk line techniques the flask was placed under a nitrogen atmosphere by pump filling 3 times whilst heating the flask and contents using a high temperature heat gun. After the flask had cooled, 7 ml of pre-dried N,N-dimethylmethanamide was transferred into the flask under nitrogen and the solution stirred for 2 minutes.

A piece of 6 cm by 8 cm bucky paper, made previously by dispersing nanotubes in dichlorobenzene by sonication then filtering through a 0.2 μm PTFR filter membrane at reduced pressure was attached to a piece of platinum wire.

This bucky paper working electrode was inserted through a subaseal, dried using a heat gun and whilst maintaining a positive pressure of nitrogen in the cell, inserted into the reaction vessel. This working electrode was lowered so that the bucky paper was partially-submerged into the electrolyte without the electrolyte directly touching the platinum wire.

The counter electrode, consisting of a piece of 5 mm by 9 mm highly ordered pyrolytic graphite attached to a platinum wire was inserted into a second subaseal; a piece of platinum wire was inserted adjacently to act as the reference electrode. Both electrodes were heated using the heat gun and then inserted into the remaining side arm of the flask. Both electrodes were then dipped into the electrolyte. All electrodes were then attached to the corresponding electrode clamps of the potentiostat avoiding shorting contacts. The complete cell is illustrated schematically in FIG. 1A.

Whilst stirring, the cell was held at −2V for 30 minutes. During this time nanotubes were seen to stream from the bucky paper working electrode and into the electrolyte to produce a grey solution. Some of these nanotubes were deposited onto the counter electrode and others remained in solution.

The ease by which certain nanotubes are initially reduced and subsequently deposited depends on their electronic character. Using Raman spectroscopy, as illustrated in FIG. 2, it was shown that, as expected, metallic tubes are reduced most easily and deposited first from the solution. Without wishing to be bound by theory, one interpretation is that this behaviour correlates with the availability of unoccupied molecular states close to the Fermi level, which is self is seen to be lower in energy for metallic tubes.

The invention claimed is:

1. A method for dispersing carbon nanotubes to produce a solution of dispersed, charged individual carbon nanotubes, comprising an electrochemical process, wherein the electrochemical process involves the transfer of a charged species between an electrode and an electrolyte, wherein the method further comprises applying a potential between a working electrode and a counter electrode, wherein the working electrode comprises carbon nanotubes, wherein the working electrode and counter electrode form part of an electrochemical cell that further comprises the electrolyte and wherein the potential is applied so as to dissolve at least some of the carbon nanotubes of the working electrode and to disperse these carbon nanotubes as charged individual carbon nanotubes in solution.

2. The method according to claim 1, wherein a positive potential is applied between the working electrode and the counter electrode.

3. The method according to claim 2, wherein the positive potential applied is about 1 V or more.

4. The method according to claim 1, wherein a negative potential is applied between the working electrode and the counter electrode.

5. The method according to claim 4, wherein the negative potential applied is about −1 V or a more negative potential.

6. The method according to claim 1, wherein the electrolyte is formed by adding a salt to a solvent.

7. The method according to claim 6, wherein the electrolyte comprises a dry polar, aprotic solvent.

8. The method according to claim 7, wherein the solvent is selected from the group consisting of dry and oxygen-free dimethylformamide, dimethylacetamide, and N-methylpyrolidone.

9. The method according to claim 6, wherein the salt is selected from the group consisting of sodium tetraphenyl borate, tetrabutylammonium hexafluorophosphate and lithium perchlorate.

10. The method according to claim 1, wherein the electrolyte is a nanotube-based electrolyte.

11. The method according to claim 10, wherein the electrolyte comprises an alkali metal nanotubide salt.

12. The method according to claim 1, wherein the method is carried out in an oxygen-free and moisture-free environment.

13. The method according to claim 1, wherein the electrochemical cell further comprises a reference electrode.

14. The method according to claim 1, wherein the electrochemical cell comprises a plurality of counter electrodes and a different potential is applied between the working electrode and each counter electrode.

15. The method according to claim 1, wherein the working electrode and counter electrode are contained within a single compartment.

16. The method according to claim 1, wherein the working electrode is contained within a first compartment and the counter electrode is contained within a second compartment, wherein the first and second compartments are linked by an electrochemical membrane.

17. The method according to claim 1, wherein the carbon nanotubes are selectively dispersed by controlling the potential applied between the working electrode and the counter electrode.

18. The method according to claim 17, wherein the carbon nanotubes are selectively dispersed on the basis of electronic character.

19. The method according to claim 17, wherein the carbon nanotubes are selectively dispersed on the basis of size.

20. The method according to claim 17, wherein the carbon nanotubes are selectively dispersed on the basis of helicity.

21. The method according to claim 1, further comprising separating the dispersed carbon nanotubes.

22. The method according to claim 21, wherein the dispersed carbon nanotubes are separated on the basis of electronic character.

23. The method according to claim 22, wherein the dispersed carbon nanotubes are separated by controlling the potential applied between the working electrode and the counter electrode.

24. The method according to claim 21, wherein the dispersed carbon nanotubes are separated by selective electrochemical deposition on to one more electrodes.

25. The method according to claim 21, wherein the dispersed carbon nanotubes are separated on the basis of size.

26. The method according to claim 25, wherein the dispersed carbon nanotubes are separated by chromatographic techniques.

27. The method according to claim 21, wherein the dispersed carbon nanotubes are separated on the basis of helicity.

28. The method according to claim 21, wherein the dispersed carbon nanotubes are selectively quenched.

29. The method according to claim 28, wherein the dispersed carbon nanotubes are quenched chemically.

30. The method according to claim 21, wherein the dispersed carbon nanotubes are quenched electrochemically.

31. The method of claim 1, wherein the dispersed carbon nanotubes are present at a concentration in the range of from about 0.01 mg/ml to about 100 mg/ml.

32. The method of claim 31, wherein the dispersed carbon nanotubes are present at a concentration in the range of from about 0.05 mg/ml to about 50 mg/ml.

* * * * *